United States Patent
Sakurada et al.

(10) Patent No.: US 11,242,033 B2
(45) Date of Patent: Feb. 8, 2022

(54) INFORMATION PROCESSING SYSTEM, INFORMATION PROCESSING DEVICE, INFORMATION PROCESSING METHOD FOR INFORMATION PROCESSING SYSTEM, RECORDING MEDIUM, AND VEHICLE INTERIOR SHARING SYSTEM FOR DELIVERING AN OBJECT STORED IN AN INTERIOR SPACE OF A VEHICLE

(71) Applicant: TOYOTA JIDOSHA KABUSHIKI KAISHA, Toyota (JP)

(72) Inventors: Shin Sakurada, Toyota (JP); Koichi Ando, Nagoya (JP); Mutsumi Matsuura, Okazaki (JP); Masato Endo, Nagakute (JP); Koki Fujita, Suginami-ku (JP); Ryuichi Suzuki, Nagakute (JP); Yuki Ito, Iwakura (JP); Hiroyasu Shiokawa, Nagoya (JP); Yasumasa Kobayashi, Nagoya (JP); Naoki Yamamuro, Nagoya (JP); Makoto Akahane, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/215,748

(22) Filed: Dec. 11, 2018

(65) Prior Publication Data
US 2019/0202405 A1 Jul. 4, 2019

(30) Foreign Application Priority Data
Dec. 28, 2017 (JP) .............................. JP2017-255022

(51) Int. Cl.
*B60R 25/24* (2013.01)
*B60R 25/01* (2013.01)

(52) U.S. Cl.
CPC ............ *B60R 25/241* (2013.01); *B60R 25/01* (2013.01)

(58) Field of Classification Search
CPC .............................. B60R 25/01; B60R 25/241
See application file for complete search history.

(56) References Cited

U.S. PATENT DOCUMENTS 10,629,015 B1 * 4/2020 Burge ................ G07C 9/00904
2009/0043681 A1 * 2/2009 Shoji ...................... G06Q 40/00
705/35

(Continued)

FOREIGN PATENT DOCUMENTS

CN 107077654 A 8/2017
CN 107481080 A 12/2017

(Continued)

OTHER PUBLICATIONS

Partial English Translation of Notification of Reason(s) for Refusal issued in Japanese Patent Application No. 2017-255022 dated Nov. 24, 2021 (4 pages).

(Continued)

*Primary Examiner* — Omer S Khan
(74) *Attorney, Agent, or Firm* — Oblon, McClelland, Maier & Neustadt, L.L.P.

(57) ABSTRACT

An information processing system includes an object information acquiring unit, a receiver information acquiring unit, and an authentication information issuing unit. The object information acquiring unit acquires delivery object information of an object from a deliverer of the object. The object is stored in an interior space of a vehicle and of which delivery is desired. The receiver information acquiring unit acquires receiver information on a receiver of the object. The authentication information issuing unit issues authentication information for locking and unlocking a door of the vehicle based on the delivery object information and the (Continued)

receiver information and transmits the authentication information to a terminal of the receiver.

19 Claims, 11 Drawing Sheets

(56) References Cited

U.S. PATENT DOCUMENTS

| | | | | |
|---|---|---|---|---|
| 2013/0284806 | A1* | 10/2013 | Margalit | G06Q 30/06 |
| | | | | 235/382 |
| 2014/0136414 | A1* | 5/2014 | Abhyanker | G06Q 50/28 |
| | | | | 705/44 |
| 2017/0134393 | A1* | 5/2017 | Islam | H04W 12/06 |
| 2017/0230831 | A1* | 8/2017 | Canis | G06Q 10/083 |
| 2018/0096270 | A1* | 4/2018 | High | G06Q 10/0633 |
| 2018/0240067 | A1* | 8/2018 | Oz | G06Q 10/08 |
| 2020/0013238 | A1* | 1/2020 | Shimano | G07B 15/02 |

FOREIGN PATENT DOCUMENTS

| | | |
|---|---|---|
| JP | 10-097691 A | 4/1998 |
| JP | 2002-13326 A | 1/2002 |
| JP | 2002-358573 A | 12/2002 |
| JP | 2006-206225 | 8/2006 |
| JP | 2009-259116 A | 11/2009 |
| JP | 2012-207452 A | 10/2012 |
| JP | 2015-45141 | 3/2015 |
| WO | WO 2013/076760 A1 | 5/2013 |
| WO | 2016/054248 A1 | 4/2016 |
| WO | WO 2016/188955 A1 | 12/2016 |

OTHER PUBLICATIONS pp. 26 to 29 of No. 942 of Crisis in Home Delivery, Key to Exit out of Crisis Lies in Three Ways of Utilizing IT, One Last Mile beyond Common Sense, Nikkei Computer, Japan, Nikkei Business Publication, Inc., published on Jul. 6, 2017.

* cited by examiner

FIG. 4

| DELIVERER ID | CONTACT INFORMATION | VEHICLE NUMBER | VEHICLE MODEL | COLOR | POSITION INFORMATION | OBJECT ID | OBJECT | AMOUNT OF MONEY | USAGE TYPE | USAGE DEADLINE |
|---|---|---|---|---|---|---|---|---|---|---|
| S001 | 090-xxxx-yyyy | ... | ... | ... | ... | P1234 | FISHING ROD | 1,000 | RENTAL | 31/10 |
| | | | | | | | | | | |

FIG. 5

| RECEIVER ID | RECEIVER NAME | CONTACT INFORMATION | RECEPTION OBJECT ID | RENTAL PERIOD | PAYMENT METHOD | CARD NUMBER |
|---|---|---|---|---|---|---|
| C001 | ○○□□ | 090-xxxx-zzzz | P1234 | 03/10 – 04/10 | CREDIT CARD | ... |

| RECEPTION OBJECT ID | RECEIVER ID | AUTHENTICATION INFORMATION | VALIDITY PERIOD |
|---|---|---|---|
| P1234 | C001 | ・・・ | 03/10 – 04/10 |
|  |  |  |  |

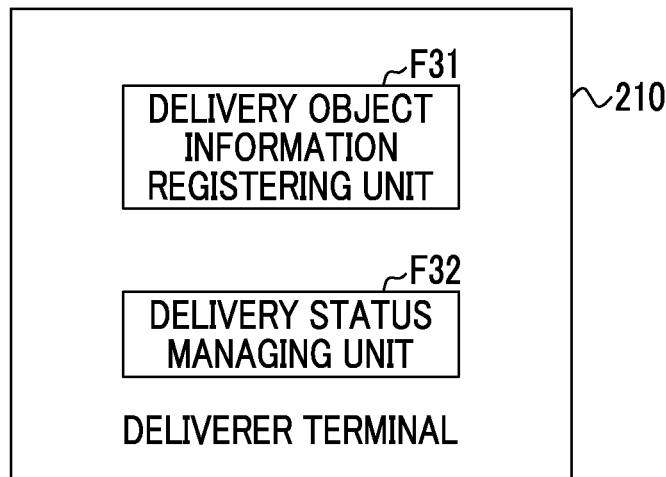

FIG. 12

USE REGISTRATION SCREEN — SC5

- SC51 — ID: C001
  NAME: ○○□□
- SC52 — RECEPTION OBJECT: FLOATING RING, PARASOL
- SC53 — PRICE FOR USE: 1,500 YEN
- SC54 — CONTACT INFORMATION [                    ]
- SC55 — USAGE DEADLINE [         ] ~ [         ]
  PAYMENT METHOD [ CREDIT CARD ▼ ]

SC56 — [ REGISTRATION ]

FIG. 13

AUTHENTICATION PROCESSING SCREEN — SC7

- SC71 — ID: C001
  NAME: ○○□□
- SC72 — RECEPTION OBJECT: FLOATING RING, PARASOL
  PRICE FOR USE: 1,500 YEN
  USAGE DEADLINE: 03/10 – 04/10

DO YOU WANT TO RECEIVE AUTHENTICATION INFORMATION AND TO UNLOCK DOOR?

SC73 — [ YES ]   SC74 — [ NO ]

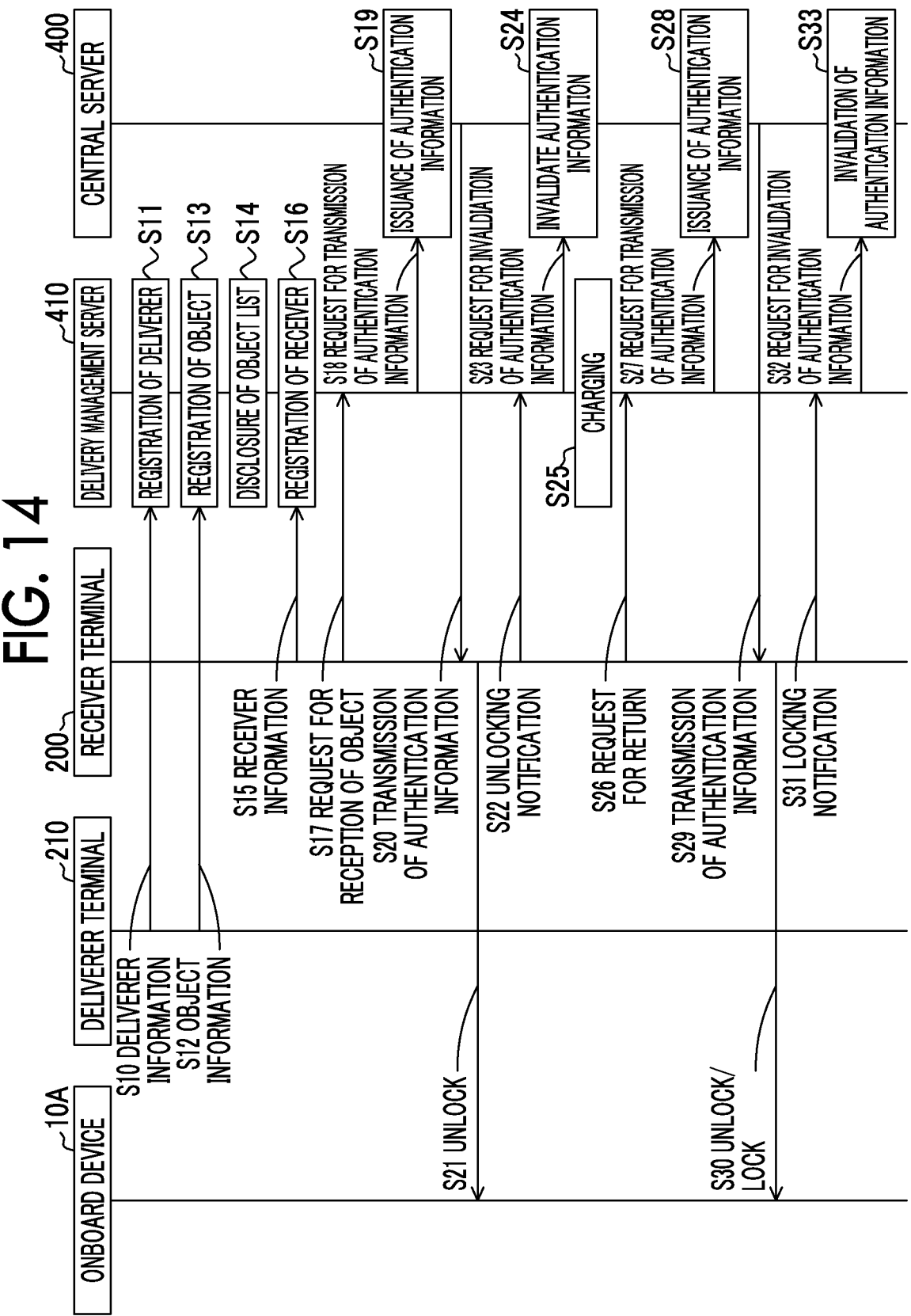

INFORMATION PROCESSING SYSTEM, INFORMATION PROCESSING DEVICE, INFORMATION PROCESSING METHOD FOR INFORMATION PROCESSING SYSTEM, RECORDING MEDIUM, AND VEHICLE INTERIOR SHARING SYSTEM FOR DELIVERING AN OBJECT STORED IN AN INTERIOR SPACE OF A VEHICLE

INCORPORATION BY REFERENCE

The disclosure of Japanese Patent Application No. 2017-255022 filed on Dec. 28, 2017 including the specification, drawings and abstract is incorporated herein by reference in its entirety.

BACKGROUND

1. Technical Field

The disclosure relates to an information processing system, an information processing device, an information processing method for an information processing system, a recording medium, and a vehicle interior sharing system.

2. Description of Related Art

A technique for delivering a delivery object to a trunk of a luggage-receiving vehicle which has been designated as a delivery destination by a receiver has been proposed (for example, see Japanese Unexamined Patent Application Publication No. 2006-206225 (JP 2006-206225 A)). According to this technique, a receiver can receive a delivery object even when the receiver is absent without providing a home delivery locker or the like for receiving a delivery object by designating a vehicle owned by the receiver as a delivery destination.

SUMMARY

However, after a home delivery service provider has delivered luggage to a vehicle, only an owner of the vehicle having a key to the vehicle can unlock the vehicle as a delivery destination and receive luggage such as a delivery object stored in a trunk of the vehicle. Accordingly, even when a family member is a receiver of the luggage, the family member not having the key may not receive luggage in the trunk (an interior space of the vehicle) until the vehicle is unlocked by an owner having the key to the vehicle. In the related art, a system in which luggage stored in an interior space of a vehicle in addition to a delivery object can be easily transferred to a third party other than a person having a key to the vehicle has not been disclosed.

Therefore, the disclosure provides a system that can improve convenience for a receiver who receives an object in an interior space of a vehicle.

In order to solve the above-mentioned problem, according to the disclosure, delivery object information of an object stored in an interior space of a vehicle is acquired and authentication information for locking and unlocking a door of the vehicle is transmitted to a terminal of a receiver based on receiver information of the object.

A first aspect of the disclosure is an information processing system. The information processing system includes an object information acquiring unit, a receiver information acquiring unit, and an authentication information issuing unit. The object information acquiring unit is configured to acquire delivery object information of an object from a deliverer of the object. The object is stored in an interior space of a vehicle and of which delivery is desired. The receiver information acquiring unit is configured to acquire receiver information on a receiver of the object. The authentication information issuing unit is configured to issue authentication information for locking and unlocking a door of the vehicle based on the delivery object information and the receiver information and to transmit the authentication information to a terminal of the receiver.

In the information processing system, the interior space of the vehicle may include a space into which an occupant of the vehicle gets (hereinafter also referred to as a passenger compartment) or a space in which luggage is stored (hereinafter also referred to as a cargo compartment). A door of the vehicle may include a door for accessing the passenger compartment and a door for accessing the cargo compartment.

With this configuration, when a deliverer registers delivery object information of an object which the deliverer wants to rent or transfer, a receiver who wants to use or purchase the object can receive authentication information for locking and unlocking the door of the vehicle in which the object will be stored using a terminal of the receiver, unlock the door of the vehicle using the received authentication information, and receive the object to be used from the vehicle. The delivery object information includes information such as a price for use of the object to be delivered and information of the vehicle serving as a delivery place. The receiver information may include, for example, information such as contact information of the receiver serving as a destination of the authentication information and a payment method. A user (a receiver) who wants to use or purchase an object can receive a desired object in a parking lot close to tourist resorts or various facilities or the like and thus it is possible to improve convenience for a receiver.

The information processing system may further include an object information providing unit configured to disclose a plurality of pieces of delivery object information acquired by the object information acquiring unit as an object list on a web site. With this configuration, a receiver can search for a desired object with reference to the delivery object information such as a reception place and request use thereof.

The information processing system may further include a reception request receiving unit configured to receive a request for reception of a predetermined object selected from the object list. The receiver information acquiring unit may be configured to acquire the receiver information on the receiver of the predetermined object. With this configuration, it is possible to issue authentication information for a vehicle which is designated as a delivery place to a receiver of an object based on the receiver information.

In the information processing system, the authentication information may include information of a validity period of the authentication information based on a usage type of the object. The validity period may be a time after the vehicle has been unlocked or locked or a deadline indicating an invalidation date and time. With this configuration, since the validity period of the authentication information for locking and unlocking the vehicle can be set depending on a usage type of an object, it is possible to achieve an improvement in security.

In the information processing system, the authentication information issuing unit may be configured to invalidate the authentication information when a notification indicating that the door of the vehicle has been unlocked or locked is received from the terminal of the receiver. Authentication information is invalidated, for example, by deleting the authentication information from a terminal of a receiver having received the authentication information. With this configuration, it is possible to invalidate the authentication information at an appropriate time after a receiver has taken out or returned an object. When an object is transferred, it is possible to reduce a validity period of authentication information and to achieve an improvement in security by invalidating the authentication information when a receiver unlocks the vehicle to receive the object.

The information processing system may further include a charging managing unit configured to charge the receiver for a cost generated in association with usage of the object when a notification indicating that the door of the vehicle has been unlocked is received from the terminal of the receiver. With this configuration, it is possible to achieve simplification of a charging process which is performed by a deliverer.

A second aspect of the disclosure is an information processing device. The information processing device includes an object information acquiring unit, a receiver information acquiring unit, and an authentication information issuing unit. The object information acquiring unit is configured to acquire delivery object information of an object from a deliverer of the object. The object is stored in an interior space of a vehicle and of which delivery is desired. The receiver information acquiring unit is configured to acquire receiver information on a receiver of the object. The authentication information issuing unit is configured to issue authentication information for locking and unlocking a door of the vehicle based on the delivery object information and the receiver information and to transmit the authentication information to a terminal of the receiver.

A third aspect of the disclosure is an information processing method for an information processing system. The information processing system includes a computer. The information processing method includes: causing the computer to acquire delivery object information of an object from a deliverer of the object, the object is stored in an interior space of a vehicle of which delivery is desired; causing the computer to acquire receiver information on a receiver of the object; and causing the computer to issue authentication information for locking and unlocking a door of the vehicle based on the delivery object information and the receiver information and to transmit the authentication information to a terminal of the receiver.

A fourth aspect of the disclosure is a non-transitory recording medium storing a program. The program causes a computer to perform a delivery object information acquiring step, a receiver information acquiring step, and an authentication information issuing step. The delivery object information acquiring step is a step of acquiring delivery object information of an object from a deliverer of the object. The object is stored in an interior space of a vehicle and of which delivery is desired. The receiver information acquiring step is a step of acquiring receiver information on a receiver of the object. The authentication information issuing step is a step of issuing authentication information for locking and unlocking a door of the vehicle based on the delivery object information and the receiver information and transmitting the authentication information to a terminal of the receiver.

A fifth aspect of the disclosure is a vehicle interior sharing system. The vehicle interior sharing system includes an authentication information issuing unit configured to transmit electronic authentication information to a terminal of a receiver to deliver an object stored in an interior space of the vehicle. The electronic authentication information is information that permit opening and closing of a door of a vehicle in which a deliverer stores the object.

In the vehicle interior sharing system, the electronic authentication information may include a limiting date and time or a limiting period.

With the disclosure, it is possible to improve convenience for a receiver who receives an object in an interior space of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating an example of a delivery object information table;

FIG. 5 is a diagram illustrating an example of a reception request table;

FIG. 8 is a diagram illustrating a functional configuration of a deliverer terminal;

FIG. 9 is a diagram illustrating a delivery object information registration screen;

FIG. 12 is a diagram illustrating a use registration screen;

FIG. 13 is a diagram illustrating an authentication information management screen;

FIG. 14 is a diagram illustrating a flow of operations in a trunk sharing system according to an embodiment.

DETAILED DESCRIPTION OF EMBODIMENTS

Hereinafter, an embodiment of the disclosure will be described. The embodiment which will be described below is an example of the disclosure and does not limit the technical scope of the disclosure to the following embodiment.

Figure 1:
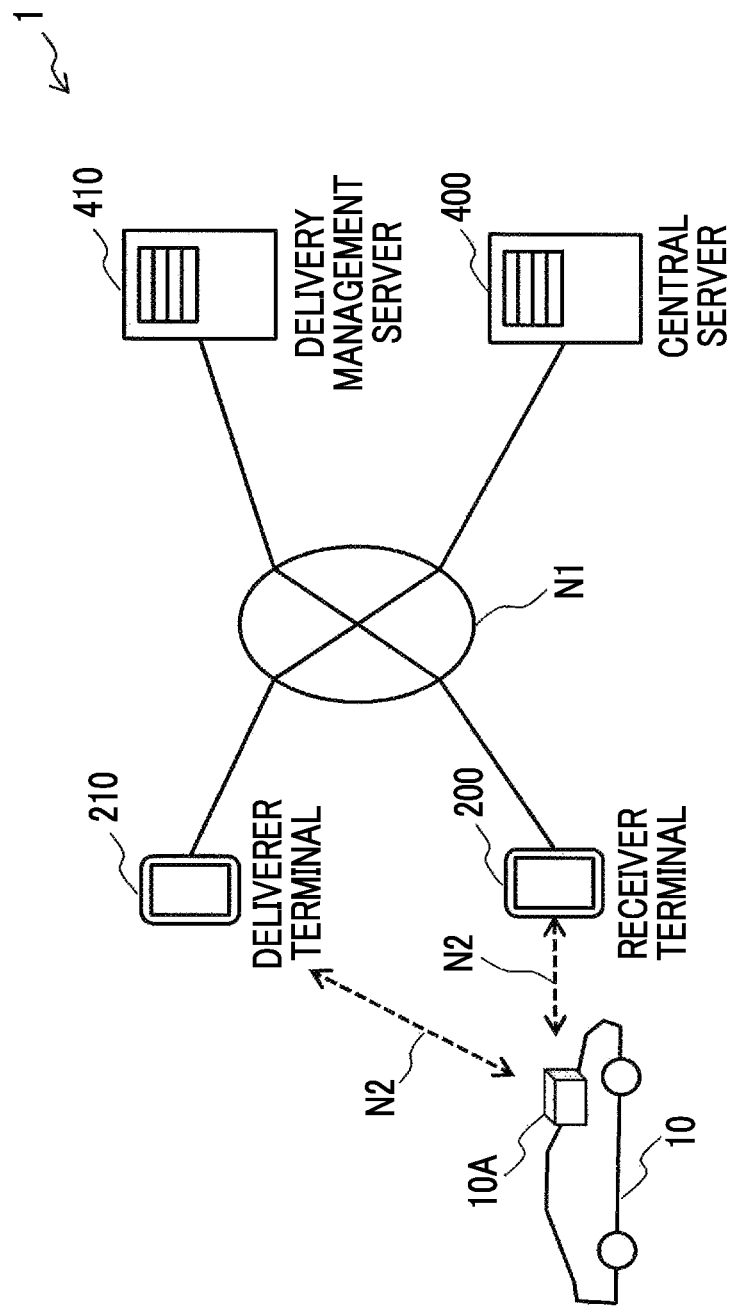
FIG. 1 is a diagram schematically illustrating a configuration of a trunk sharing system according to an embodiment.

FIG. 1 is a diagram schematically illustrating a configuration of a trunk sharing system according to an embodiment of the disclosure. The trunk sharing system 1 is a system that allows an object possessed by a deliverer to be delivered to a receiver who wants to use or purchase the object using an interior space of a vehicle designated by the deliverer as a delivery place. Here, possessing includes, for example, owning an object, not owning an object but managing the object instead of an owner thereof, and taking charge of an object for an owner. A deliverer can provide a service such as rental or sale of an object to a third party using an interior space of a vehicle owned by the deliverer like a rental shop or a vending machine. The trunk sharing system 1 is an example of an "information processing system" and a "vehicle interior sharing system."

In the example illustrated in FIG. 1, the trunk sharing system 1 includes an onboard unit 10A that is installed in a vehicle 10, a receiver terminal 200, a deliverer terminal 210, a central server 400, and a delivery management server 410. The onboard unit 10A, the receiver terminal 200, the deliverer terminal 210, the central server 400, and the delivery management server 410 are connected to each other via a network N1. The onboard unit 10A is connected to the receiver terminal 200 or the deliverer terminal 210 via a network N2 including a short-range radio communication network.

The delivery management server 410 receives registration of an object to be delivered (hereinafter also referred to as a delivery object) from the deliverer terminal 210. A deliverer can register delivery object information on a delivery object, for example, through an application (hereinafter also referred to as a predetermined application) for using a service provided by the trunk sharing system 1 which is installed in the deliverer terminal 210. The delivery object information includes identification information of a deliverer. The identification information of a deliverer is correlated with a vehicle 10 which is occupied by the deliverer in advance in the central server 400 or the delivery management server 410. The delivery management server 410 provides a list of delivery objects which can be rented or transferred by disclosing a list of delivery objects registered by the deliverer terminal 210 on a web site. A receiver who wants to use or purchase a delivery object requests use via the receiver terminal 200 with reference to the list of delivery objects. A receiver can register information on a request for use of a delivery object, for example, through a predetermined application installed in the receiver terminal 200.

When a request for use of a delivery object has been received from the receiver terminal 200, the delivery management server 410 requests the central server 400 to transmit authentication information for unlocking a vehicle 10 in which the delivery object of which the request for use has been received will be stored to the receiver terminal 200 based on the delivery object information received from the deliverer terminal 210. The central server 400 transmits authentication information of a vehicle 10 correlated with identification information of a deliverer to the receiver terminal 200 based on the identification information of the deliverer included in the delivery object information. Then, a receiver can lock and unlock the vehicle 10 using the authentication information received by the receiver terminal 200 and receive the delivery object of which use has been requested. The authentication information may be transmitted from the central server 400 to the delivery management server 410 and then be transmitted from the delivery management server 410 to the receiver terminal 200. Here, the authentication information is digital information which is used to allow the onboard unit 10A to perform locking and unlocking of the vehicle 10 by being transmitted from the receiver terminal 200 to the onboard unit 10A and being subjected to authentication by the onboard unit 10A. Locking and unlocking of a vehicle 10 is a process of locking and unlocking a door of the vehicle 10 in which a delivery object is stored. The authentication information is an example of "electronic authentication information."

Figure 2:
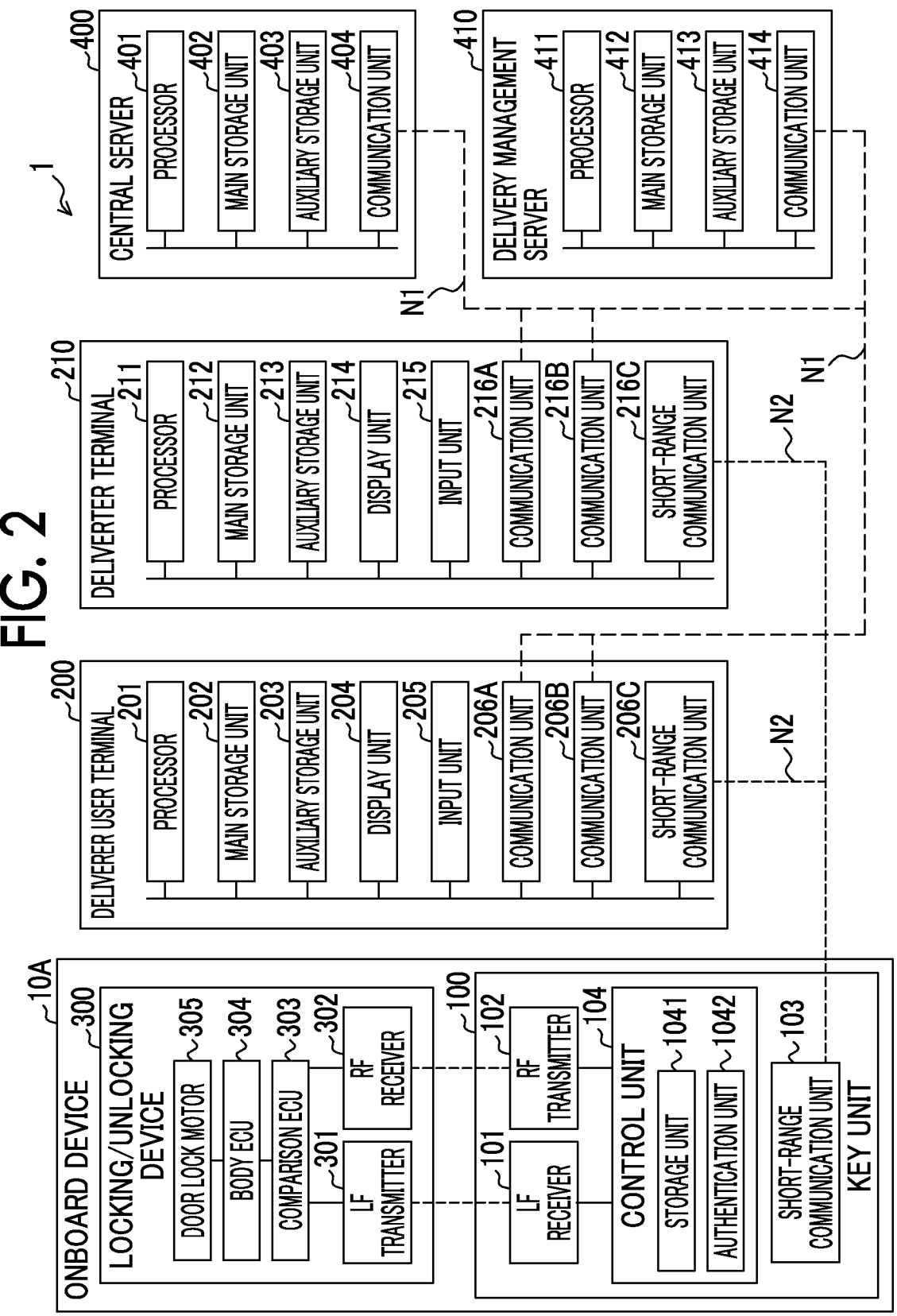
FIG. 2 is a diagram illustrating hardware configurations of an onboard unit, a receiver terminal, a deliverer terminal, a central server, and a delivery management server.

FIG. 2 is a diagram illustrating hardware configurations of an onboard unit, a receiver terminal, the central server, and the delivery management server. In this embodiment, the disclosure is applied to a vehicle 10 that is locked and unlocked by a key unit 100 of the onboard unit 10A. The key unit 100 includes the same radio interface as an electronic key such as a smart key (hereinafter referred to as a portable unit), and can perform locking and unlocking of the vehicle 10 without using a physical key by communicating with an existing locking/unlocking device 300 of the onboard unit 10A. The key unit 100 performs short-range radio communication with a mobile terminal such as a receiver terminal 200 or a deliverer terminal 210 (hereinafter referred to as a receiver terminal 200 or the like) and determines whether it serves as an electronic key for the vehicle 10 based on a result of authentication for the receiver terminal 200 or the like.

Authentication information which is transmitted from the receiver terminal 200 or the like to the key unit 100 is compared with authentication information which is stored in advance in the key unit 100. When authentication has succeeded, the receiver terminal 200 or the like is authenticated. When the receiver terminal 200 or the like has been authenticated, the key unit 100 transmits a key ID (an ID of an electronic key) for the vehicle 10 which is stored in advance in the key unit 100 and correlated with the authentication information to the locking/unlocking device 300 along with a locking/unlocking signal. The locking/unlocking device 300 locks and unlocks the vehicle 10 when the key ID received from the key unit 100 coincides with a key ID which is stored in advance in the locking/unlocking device 300. The key ID stored in advance in the key unit 100 may be encrypted with authentication information. In this case, when authentication for the receiver terminal 200 or the like has succeeded, the key unit 100 can decrypt the key ID with the authentication information and then transmit the decrypted key ID to the locking/unlocking device 300.

A deliverer terminal 210 of a deliverer who is an occupier of the vehicle 10 stores master authentication information which can be authenticated by the key unit 100, and the deliverer can lock and unlock the vehicle 10 at any time. In this embodiment, a validity period is not set in the master authentication information. On the other hand, at the time of receiving or returning an object, the receiver terminal 200 receives authentication information for locking and unlocking the vehicle 10 from the central server 400 or the delivery management server 410. The receiver terminal 200 transmits the received authentication information to the key unit 100, and the key unit 100 transmits the key ID of the vehicle 10 stored in advance in the key unit 100 to the locking/unlocking device 300 when authentication of the receiver terminal 200 by the key unit 100 has succeeded. When the key ID received from the key unit 100 coincides with the key ID stored in advance in the locking/unlocking device 300, the locking/unlocking device 300 locks and unlocks the vehicle 10. The key unit 100 and the locking/unlocking device 300 operate with electric power which is supplied from a battery mounted in the vehicle 10.

The locking/unlocking device 300 is a device that locks and unlocks a door of the vehicle 10 and is an existing device constituting a part of a smart key system. Specifically, the locking/unlocking device 300 locks and unlocks the door of the vehicle 10 in accordance with a locking signal and an unlocking signal which are transmitted from a portable unit which is carried by a user of the vehicle 10 using radio waves of a radio frequency (hereinafter referred to as RF) band. The locking/unlocking device 300 also has a function of transmitting radio waves of a low frequency (hereinafter referred to as LF) band for detecting the portable unit.

In this embodiment, instead of a portable unit carried by a user, the key unit 100 controls locking and unlocking of the door of the vehicle 10 by transmitting and receiving radio waves of an RF band and an LF band to and from the locking/unlocking device 300. In the following description, unless otherwise mentioned, a communication destination of the locking/unlocking device 300 is limited to the key unit 100.

The locking/unlocking device 300 includes an LF transmitter 301, an RF receiver 302, a comparison ECU 303, a body ECU 304, and a door lock motor 305. The LF transmitter 301 is means that transmits radio waves of an LF band (for example, 100 KHz to 300 KHz) for detecting (polling) the key unit 100. The LF transmitter 301 is incorporated, for example, in a center console or in the vicinity of a steering wheel in a passenger compartment. The RF receiver 302 is means that receives radio waves of an RF band (for example, 100 MHz to 1 GHz) transmitted from the key unit 100. The RF receiver 302 is incorporated at any position in the passenger compartment.

The comparison ECU 303 is a computer that performs control for locking and unlocking the door of the vehicle 10 based on a signal (a locking signal or an unlocking signal) transmitted from the key unit 100 using radio waves of an RF band. The comparison ECU 303 is constituted, for example, by a microcomputer. In the following description, the locking signal and the unlocking signal are collectively referred to as a locking/unlocking signal. The term, locking/unlocking signal, represents at least one of the locking signal and the unlocking signal.

The comparison ECU 303 authenticates whether the locking/unlocking signal transmitted from the key unit 100 has been transmitted from a rightful device. Specifically, the comparison ECU 303 determines whether the key ID included in the locking/unlocking signal coincides with a key ID stored in advance in a storage unit of the comparison ECU 303. Then, the comparison ECU 303 transmits an unlocking command or a locking command to the body ECU 304 based on the determination result. The unlocking command or the locking command is transmitted via an onboard network such as a controller area network (CAN).

The body ECU 304 is a computer that executes body control of the vehicle 10. The body ECU 304 has a function of unlocking and locking the door of the vehicle 10 by controlling the door lock motor 305 based on the unlocking command or the locking command received from the comparison ECU 303. The door lock motor 305 is an actuator that locks and unlocks the door of the vehicle 10 (which includes a trunk door in addition to a boarding door or a rear gate). The door lock motor 305 operates based on a signal transmitted from the body ECU 304. The comparison ECU 303 and the body ECU 304 may be embodied as a single body.

The key unit 100 will be described now. The key unit 100 is a device that is disposed at a predetermined position (for example, inside a glove box) of the passenger compartment of the vehicle 10. The key unit 100 has a function of authenticating the receiver terminal 200 or the like by performing short-range radio communication with the receiver terminal 200 or the like and a function of transmitting a locking/unlocking signal using radio waves of an RF band based on the authentication result. The key unit 100 includes an LF receiver 101, an RF transmitter 102, a short-range communication unit 103, and a control unit 104.

The LF receiver 101 is means that receives a polling signal which is transmitted from the locking/unlocking device 300 using radio waves of an LF band. The LF receiver 101 includes an antenna for receiving radio waves of an LF band (hereinafter referred to as an LF antenna). The RF transmitter 102 is means that transmits a locking/unlocking signal to the locking/unlocking device 300 using radio waves of an RF band.

The short-range communication unit 103 is means that communicates with the receiver terminal 200 or the like which is carried by a user such as a receiver. The short-range communication unit 103 performs communication in a short range (at a distance at which communication can be performed between the interior and the exterior of the vehicle) using a predetermined radio communication standard.

In this embodiment, the short-range communication unit 103 performs data communication based on a Bluetooth (registered trademark) low energy standard (hereinafter referred to as BLE). BLE is a low-energy communication standard using Bluetooth, and is characterized in that communication can be started immediately when a communication partner is detected without requiring pairing between devices. In this embodiment, BLE is exemplified, but other radio communication standards can also be used. For example, near field communication (NFC), ultra wideband (UWB), and WiFi (registered trademark) may be used.

The control unit 104 is a computer that performs short-range radio communication with the receiver terminal 200 via the short-range communication unit 103 and performs control for authenticating the receiver terminal 200 or the like and control for transmitting a locking/unlocking signal based on the authentication result. The control unit 104 is constituted, for example, by a microcomputer.

The control unit 104 includes a storage unit 1041 and an authentication unit 1042. A control program for controlling the key unit 100 is stored in the storage unit 1041. The control unit 104 may realize various functional units including the authentication unit 1042 by causing a CPU (not illustrated) to execute the control program stored in the storage unit 1041. For example, the control unit 104 may realize a function of receiving a polling signal transmitted as radio waves of an LF band from the locking/unlocking device 300 via the LF receiver 101, a function of transmitting a locking/unlocking signal as radio waves of an RF band to the locking/unlocking device 300 via the RF transmitter 102, a function of processing communication with the receiver terminal 200 or the like which is performed by the short-range communication unit 103, and a function of generating a locking/unlocking signal when authentication of the receiver terminal 200 or the like by the authentication unit 1042 has succeeded.

The authentication unit 1042 authenticates the receiver terminal 200 or the like based on authentication information included in a locking request or an unlocking request (hereinafter collectively referred to as a locking/unlocking request) transmitted from the receiver terminal 200 or the like. Specifically, the authentication unit 1042 compares the authentication information transmitted from the receiver terminal 200 or the like with the authentication information stored in the storage unit 1041 and determines that authentication has succeeded when the two pieces of authentication information satisfy a predetermined relationship. When the two pieces of authentication information do not satisfy the predetermined relationship, the authentication unit 1042 determines that authentication has failed. Here, the predetermined relationship includes a case in which the authentication information stored in the storage unit 1041 coincides with the authentication information transmitted from the receiver terminal 200 or the like, a case in which results of predetermined processes such as encryption and decryption using the two pieces of authentication information coincide with each other, and a case in which a result of decryption on one of the two pieces of authentication information coincides with that on the other thereof.

When authentication of the receiver terminal 200 or the like by the authentication unit 1042 has succeeded, a locking/unlocking signal which is generated in response to a request received from the receiver terminal 200 or the like is transmitted to the locking/unlocking device 300 via the RF transmitter 102. The authentication method which is performed by the authentication unit 1042 may be a method of verifying coincidence through simple comparison between the pieces of authentication information or may be a method using an asymmetric cipher. In the following description, the authentication information stored in the key unit 100 is referred to as device authentication information and the authentication information transmitted from the receiver terminal 200 or the like is referred to as terminal authentication information, if necessary.

The key unit 100 transmits an ID of an electronic key (a key ID) along with a locking/unlocking signal to the locking/unlocking device 300. The key ID may be stored in the key unit 100 in a plaintext state in advance or may be stored in a state in which it has been encrypted using a cipher specific to the receiver terminal 200 or the like. When the key ID is stored in an encrypted state, the encrypted key ID may be decrypted using authentication information transmitted from the receiver terminal 200 or the like to acquire the original key ID.

The delivery management server 410 has a general configuration of a computer. The delivery management server 410 includes a processor 411, a main storage unit 412, an auxiliary storage unit 413, and a communication unit 414. These elements are connected to each other via a bus. The main storage unit 412 and the auxiliary storage unit 413 are computer-readable recording mediums. The hardware configuration of a computer is not limited to the example illustrated in FIG. 2, and omission, substitution, or addition of elements may be appropriately performed thereon.

The delivery management server 410 can realize functions corresponding to a predetermined purpose by causing the processor 411 to load a program stored in a recording medium into a work area of the main storage unit 412 and to execute the loaded program and controlling the constituent units or the like through execution of the program.

The processor 411 is, for example, a central processing unit (CPU) or a digital signal processor (DSP). The processor 411 controls the delivery management server 410 and performs various information processing operations. The main storage unit 412 includes, for example, a random access memory (RAM) or a read only memory (ROM). The auxiliary storage unit 413 is, for example, an erasable programmable ROM (EPROM) or a hard disk drive (HDD). The auxiliary storage unit 413 can include a removable medium, that is, a portable recording medium. The removable medium is, for example, a universal serial bus (USB) memory or a disk recording medium such as a compact disc (CD) or a digital versatile disc (DVD).

The auxiliary storage unit 413 stores various programs, various types of data, and various tables on a recording medium in a readable and writable manner. An operating system (OS), various programs, various tables, and the like are stored in the auxiliary storage unit 413. Information stored in the auxiliary storage unit 413 may be stored in the main storage unit 412. Information stored in the main storage unit 412 may be stored in the auxiliary storage unit 413.

The communication unit 414 is connected to another device and controls communication between the delivery management server 410 and the other device. The communication unit 414 is, for example, a local area network (LAN) interface board and a radio communication circuit for radio communication. The LAN interface board or the radio communication circuit is connected to the network N1 such as the Internet which is a public communication network.

A sequence of processes which is performed by the delivery management server 410 may be performed by hardware or may be performed by software.

Similarly to the delivery management server 410, the central server 400 includes a processor 401, a main storage unit 402, an auxiliary storage unit 403, and a communication unit 404. The processor 401, the main storage unit 402, the auxiliary storage unit 403, and the communication unit 404 are the same as the processor 411, the main storage unit 412, the auxiliary storage unit 413, and the communication unit 414 of the delivery management server 410 and thus description thereof will not be repeated.

The receiver terminal 200 and the deliverer terminal 210 are small computers such as a smartphone, a mobile phone, a tablet terminal, a personal information terminal, or a wearable computer (such as a smart watch). The deliverer terminal 210 may be a personal computer (PC) which is connected to the delivery management server 410 via the network N1 such as the Internet which is a public communication network.

The deliverer terminal 210 includes a processor 211, a main storage unit 212, an auxiliary storage unit 213, a display unit 214, an input unit 215, a communication unit 216A, a communication unit 216B, and a short-range communication unit 216C. The processor 211, the main storage unit 212, and the auxiliary storage unit 213 are the same as the processor 411, the main storage unit 412, and the auxiliary storage unit 413 of the delivery management server 410 and thus description thereof will not be repeated. The display unit 214 is, for example, a liquid crystal display (LCD) or an electroluminescence (EL) panel. The input unit 215 includes a touch panel and push buttons. The input unit 215 may include a video or image input unit such as a camera or a sound input unit such as a microphone. The communication unit 216A is a communication circuit that accesses the Internet, for example, via a mobile phone network with a base station as a terminal. The communication unit 216B is a communication circuit that accesses the Internet, for example, via a wireless or wired LAN and performs data communication with the delivery management server 410. The short-range communication unit 216C is a communication circuit that performs short-range communication in accordance with a predetermined communication standard. Examples of the predetermined communication standard include BLE and NFC.

Similarly to the deliverer terminal 210, the receiver terminal 200 includes a processor 201, a main storage unit 202, an auxiliary storage unit 203, a display unit 204, an input unit 205, a communication unit 206A, a communication unit 206B, and a short-range communication unit 206C. The processor 201, the main storage unit 202, the auxiliary storage unit 203, the display unit 204, and the input unit 205 are the same as the processor 211, the main storage unit 212, the auxiliary storage unit 213, the display unit 214, and the input unit 215 of the deliverer terminal 210 and thus description thereof will not be repeated. The communication unit 206A is a communication circuit that accesses the Internet, for example, via a mobile phone network with a base station as a terminal. The communication unit 206B is a radio communication circuit that accesses the Internet, for example, via a wireless LAN such as WiFi. The receiver terminal 200 can perform data communication with the delivery management server 410 or the central server 400 via the communication unit 206B. The short-range communication unit 206C controls communication with the vehicle 10 at a relatively short distance in accordance with a predetermined communication standard. Examples of the predetermined communication standard include BLE and NFC.

The network N1 may be, for example, a global public communication network such as the Internet, and a wide area network (WAN) or other communication networks may be employed. The network N1 may include a telephone communication network for mobile phones and the like and a radio communication network such as WiFi. The receiver terminal 200 and the deliverer terminal 210 can access the Internet via the telephone communication network for mobile phones and the like or the radio communication network such as WiFi. The network N2 includes a communication network for BLE via which the receiver terminal 200 and the deliverer terminal 210 communicate with the onboard unit 10A. The receiver terminal 200 and the deliverer terminal 210 can communicate with the onboard unit 10A by BLE communication.

Figure 3:
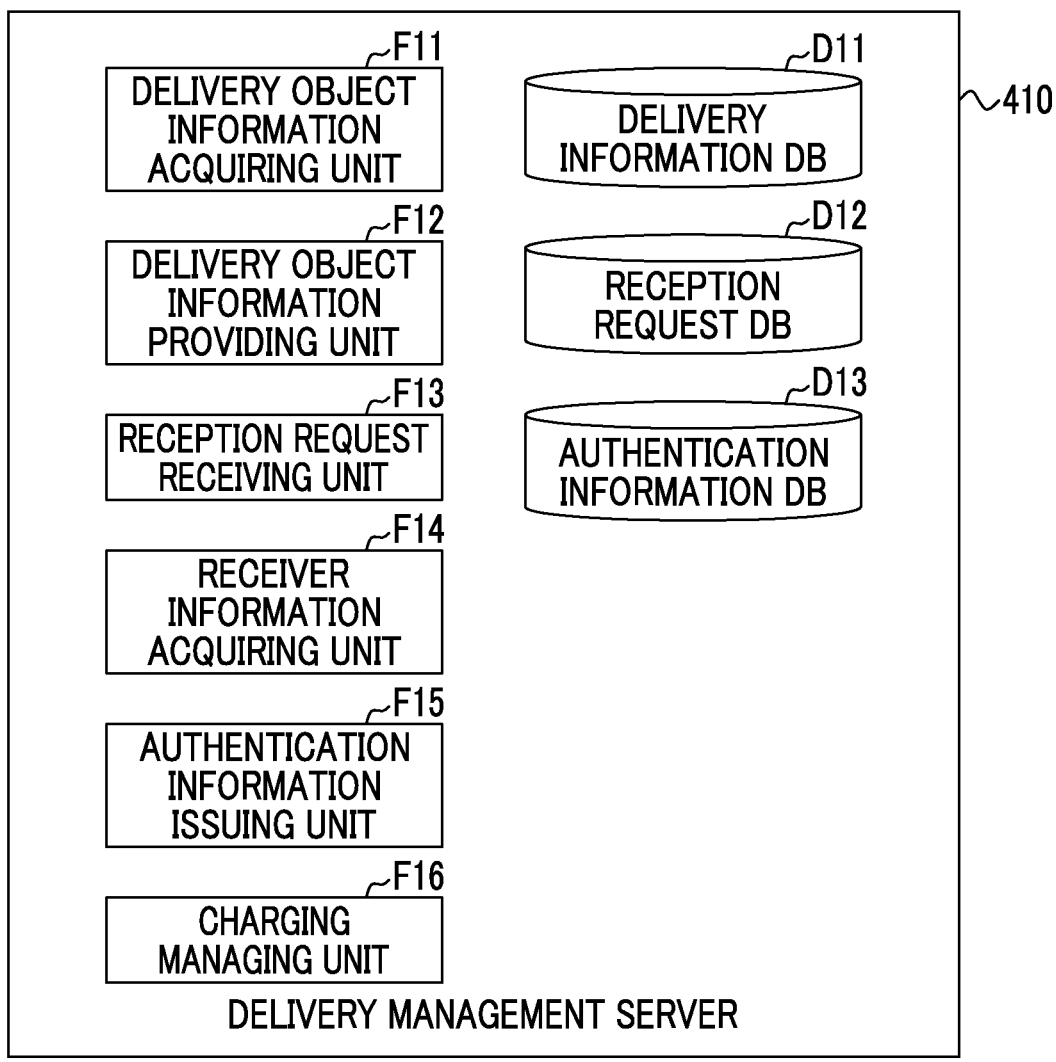
FIG. 3 is a diagram illustrating a functional configuration of the delivery management server.

FIG. 3 is a diagram illustrating a functional configuration of the delivery management server. The delivery management server 410 includes a delivery object information acquiring unit F11, a delivery object information providing unit F12, a reception request receiving unit F13, a receiver information acquiring unit F14, an authentication information issuing unit F15, a charging managing unit F16, a delivery object information database D11, a reception request database D12, and an authentication information database D13. The processor 411 of the delivery management server 410 performs processes of the delivery object information acquiring unit F11, the delivery object information providing unit F12, the reception request receiving unit F13, the receiver information acquiring unit F14, the authentication information issuing unit F15, and the charging managing unit F16 by executing a computer program in the main storage unit 412. One of the functional units or some of the processes thereof may be implemented by a hardware circuit.

The delivery object information database D11, the reception request database D12, and the authentication information database D13 are constructed by causing a program of a database management system (DBMS) which is executed by the processor 411 to manage data stored in the auxiliary storage unit 413. The delivery object information database D11, the reception request database D12, and the authentication information database D13 are, for example, relational databases.

One of the functional units of the delivery management server 410 or some of the processes thereof may be implemented by the central server 400 or another computer connected to the network N1.

The delivery object information acquiring unit F11 receives registration of delivery object information associated with a deliverer who wants to rent or transfer an object. The delivery object information includes identification information of the deliverer correlated with a vehicle 10 which is used as an object delivery place. The identification information of the vehicle 10 and the identification information of the deliverer are correlated in advance in the authentication information database D13 or the central server 400. The delivery object information acquiring unit F11 receives registration of an object to be rented or transferred from the deliverer. The delivery object information acquiring unit F11 receives information on the deliverer and the object, which has been input from the deliverer terminal 210 by the deliverer, from the deliverer terminal 210 via the network N1. The delivery object information acquiring unit F11 registers the received information in the delivery object information database D11.

The delivery object information providing unit F12 provides the information of the object received from the deliverer terminal 210 to a receiver who wants to use or purchase the object. The delivery object information providing unit F12 discloses, for example, a list of objects (hereinafter also referred to as an object list) which are registered in a web site provided by the delivery management server 410 by the deliverer. A receiver can access the web site via the receiver terminal 200 and refer to the object list. The object list is an example of an "object list."

The reception request receiving unit F13 receives a request for use or purchase of an object from a receiver. The reception request receiving unit F13 receives information on a request for reception including identification information, a usage period, and a payment method of an object to be used by the receiver from the receiver terminal 200. The reception request receiving unit F13 registers the received information in the reception request database D12 in correlation with the identification information of the receiver.

The receiver information acquiring unit F14 acquires information on the receiver. The information on the receiver includes information such as contact information which is a transmission destination of authentication information. The receiver information acquiring unit F14 receives information on the receiver which is input to the receiver terminal 200 by the receiver from the receiver terminal 200. The information on the receiver may be input from the receiver terminal 200 along with information on a request for reception of an object.

When the reception request receiving unit F13 receives a request for reception from the receiver terminal 200, the authentication information issuing unit F15 requests the central server 400 to transmit authentication information (terminal authentication information) corresponding to authentication information (device authentication information) stored in the key unit 100 of a vehicle 10 in which the object as a target of the request for reception is stored to the receiver terminal 200 which is a transmission source of the request for reception. By causing the authentication information issuing unit F15 to notify the central server 400 of the identification information of the deliverer, the central server 400 can transmit terminal authentication information correlated with the identification information of the deliverer to the receiver terminal 200. The authentication information issuing unit F15 may acquire authentication information of the vehicle 10 in which an object as a target of the request of reception is stored from the central server 400 and may transmit the acquired authentication information to the receiver terminal 200 having transmitted the request for reception from the delivery management server 410. The authentication information issuing unit F15 may authenticate whether the request for reception is a request from the receiver terminal 200 of a receiver of whom use has been registered from a predetermined application with reference to information on the received acquired by the receiver information acquiring unit F14.

The authentication information issuing unit F15 may acquire authentication information transmitted from the central server 400 to the receiver terminal 200 and store the acquired authentication information in the authentication information database D13. The authentication information issuing unit F15 may acquire information such as a vehicle model, a color, and a vehicle number of the vehicle 10 along with the authentication information from the central server 400.

When the vehicle 10 in which an object of which use or purchase has been requested by the receiver is stored is unlocked using the authentication information transmitted to the receiver terminal 200 in order to receive the object, the charging managing unit F16 charges the receiver for a price for the object. The charging managing unit F16 can charge the receiver for the price in accordance with a payment method acquired from the receiver by the receiver information acquiring unit F14. For example, when payment using a credit card is designated as the payment method, the charging managing unit F16 transmits information such as a credit card number and a purchase price to a card company and requests a payment process. When carrier payment in which the price is paid along with a mobile phone fee is designated as the payment method, a request for a payment process is transmitted to a communication carrier and the price is paid along with the mobile phone fee.

The delivery object information database D11 is a database that stores information on deliverers and information on objects to be delivered. The delivery object information database D11 includes a delivery object information table illustrated in FIG. 4. Information which is stored in the delivery object information table illustrated in FIG. 4 is not limited to the example illustrated in FIG. 4 and addition, modification, and deletion of fields may be appropriately performed thereon. The information on deliverers and the information on objects may be managed by individual tables.

FIG. 4 is a diagram illustrating an example of the delivery object information table. The delivery object information table is used to store information of objects to be rented or transferred by deliverers and to provide an object list. In FIG. 4, one record which is stored in the delivery object information table stores information of one object which has been registered to be rented or transferred by a deliverer.

A record in the delivery object information table includes fields of deliverer ID, contact information, vehicle number, vehicle model, color, position information, object ID, object, amount of money, usage type, and usage deadline. The deliverer ID is an ID for identifying a deliverer. The deliverer ID is correlated with authentication information of a vehicle 10 in advance in the central server 400. The contact information is contact information of the deliverer. The contact information is, for example, a mobile phone number or an e-mail address of the deliverer and can be used as a transmission destination of authentication information. The vehicle number, the vehicle model, and the color are information which is used for a receiver to specify a vehicle 10 which is a delivery place, and are the vehicle number, the vehicle model, and the color of the vehicle 10. The position information is a location of the vehicle 10 and may be an address or the like which is registered by the deliverer. The position information may be position information which is calculated by a GPS device (not illustrated) of the onboard unit 10A having received signals from GPS satellites.

The object ID is an ID for identifying an object which has been registered by the deliverer. The object ID is set by the delivery object information acquiring unit F11, for example, when registration of information of an object has been received. The object is a name of an object to be rented or transferred. The amount of money is an amount of money of a price which is paid by a receiver to use the object to be rented or transferred. The usage type is a classification of whether the object is rented (short-term rental or long-term rental) or transferred. The usage deadline is a deadline up to which the object can be rented or transferred and is set by the deliverer.

The reception request database D12 illustrated in FIG. 3 is a database that stores information on requests for reception and information on receivers. The reception request database D12 includes a reception request table illustrated in FIG. 5. Information which is stored in the reception request table illustrated in FIG. 5 is not limited to the example illustrated in FIG. 5 and addition, modification, and deletion of fields may be appropriately performed thereon. The information on requests for reception and the information on receivers may be managed by individual tables by correlating them using information for identifying the receivers.

FIG. 5 is a diagram illustrating an example of the reception request table. The reception request table stores information on a request for reception from a receiver and is used to request the central server 400 to transmit authentication information in response to a request for reception or to notify a deliverer of a usage status of an object. In FIG. 5, one record stored in the reception request table stores information for using one object selected from the object list by a receiver.

A record of the reception request table includes fields of receiver ID, receiver name, contact information, reception object ID, rental period, payment method, and card number. The receiver ID is an ID for identifying a receiver having requested reception of an object to receive a service from the trunk sharing system 1. The receiver ID may be an ID which is designated by a receiver when registration of the receiver is performed or may be an ID which is set by the reception request receiving unit F13 when registration of information on the receiver has been received. The receiver name is a name of the receiver having requested reception of an object. The contact information is a transmission destination of authentication information and, for example, a mobile phone number or an e-mail address of the receiver terminal 200 is stored. The reception object ID is an ID for identifying an object of which use or purchase has been requested by the receiver and is an object ID which is set when a deliverer registers an object. The rental period is a period in which the receiver wants to use the object when the usage type is rental. The payment method is a method which is used for the receiver to pay a price for an object, and an example thereof is payment using a credit card. The card number is a number of a credit card which is used to pay the price when the payment method is payment using a credit card. The reception request table may include a field for managing a payment status such as when a request for payment for the received object has been issued or whether payment has been completed and the field of payment status may be updated by the charging managing unit F16.

The authentication information database D13 illustrated in FIG. 3 is a database that stores key information of a vehicle 10 which is designated as an object delivery place. The authentication information database D13 includes an authentication information table illustrated in FIG. 6. Information which is stored in the authentication information table illustrated in FIG. 6 is not limited to the example illustrated in FIG. 6 and addition, modification, and deletion of fields may be appropriately performed thereon.

Figures 6, 7:
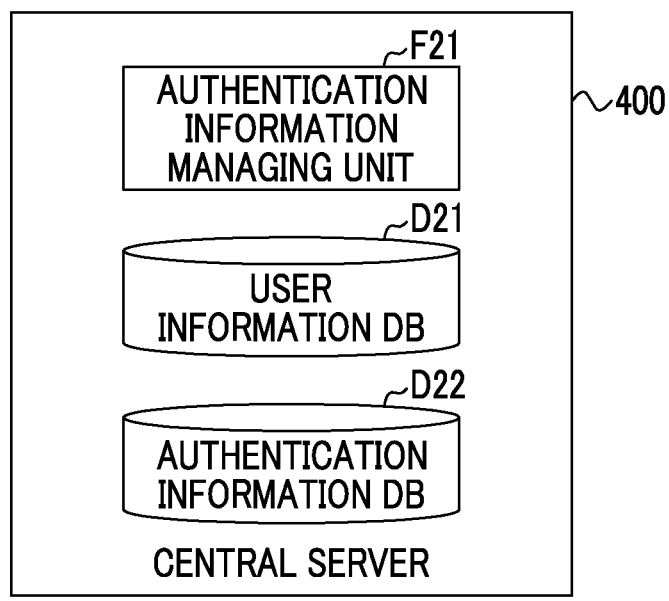
FIG. 6 is a diagram illustrating an example of an authentication information table.
FIG. 7 is a diagram illustrating a functional configuration of the central server.

FIG. 6 is a diagram illustrating an example of the authentication information table. The authentication information table is used to issue authentication information from the delivery management server 410 to a receiver terminal 200. The authentication information table is used to store information on authentication information acquired from the central server 400 when a request for reception of an object has been received from a receiver. In FIG. 6, one record which is stored in the authentication information table stores authentication information which is issued in response to a request for reception of an object selected from an object list by a receiver. In the example illustrated in FIG. 6, authentication information is managed for each object, but authentication information may be managed for each vehicle 10 when a plurality of objects stored in the same vehicle 10 is delivered.

A record of the authentication information table includes fields of reception object ID, receiver ID, authentication information, and validity period. The reception object ID is an object ID for identifying an object of which rental or purchase has been requested by a receiver. The receiver ID is an ID of the receiver who receives the object identified by the reception object ID. The authentication information is authentication information for unlocking a vehicle 10 in which an object to be delivered is stored. The field of authentication information stores authentication information acquired from the central server 400.

The validity period is a validity period of the authentication information and may be set depending on a usage type of the object. For example, the validity period can be set to one day when the usage type is rental and can be set to 30 minutes when the usage type is transfer. The validity period may be set to a validity period indicating an invalidation date and time of authentication information based on a date and time at which the delivery management server 410 receives a request for reception. The validity period included in the authentication information acquired from the central server 400 may be set. When the validity period has expired, the authentication information is invalidated. The authentication information can be invalidated, for example, by deleting the authentication information stored in the authentication information table. In this case, when an operation of unlocking the vehicle 10 has been performed using a predetermined application in the receiver terminal 200 and there is no corresponding authentication information in the authentication information table, the unlocking operation can be invalidated.

FIG. 7 is a diagram illustrating a functional configuration of the central server. The central server 400 includes an authentication information managing unit F21, a user information database D21, and an authentication information database D22 as functional units. The processor 401 of the central server 400 performs processes of the authentication information managing unit F21, the user information database D21, and the authentication information database D22 by executing a computer program. One of the functional units or some of the processes thereof may be implemented by a hardware circuit.

One of the functional units of the central server 400 or some of the processes thereof may be implemented by the delivery management server 410 or another computer connected to the network N1.

The authentication information managing unit F21 receives a request for transmission of authentication information from the delivery management server 410. The authentication information managing unit F21 receives information of a receiver terminal 200 which is a transmission destination of authentication information and identification information of a deliverer correlated with a key unit 100 of a vehicle 10 which is locked or unlocked along with the request for transmission of authentication information. The authentication information managing unit F21 transmits authentication information (terminal authentication information) corresponding to the key unit 100 to the receiver terminal 200. The authentication information managing unit F21 may generate authentication information including information of a validity period. The key unit 100 of the onboard unit 10A can receive the authentication information including information of a validity period and determine that the authentication information is invalidated and prohibit locking and unlocking of the vehicle 10 when the validity period has expired. The authentication information may be transmitted to the delivery management server 410 and then be transmitted from the delivery management server 410 to the receiver terminal 200.

The user information database D21 stores identification information of a deliverer, a corresponding password, and identification information of a vehicle 10 correlated with the deliverer. The authentication information database D22 stores authentication information for a vehicle 10. The authentication information for a vehicle 10 is information correlated with the identification information (a key ID) of the vehicle 10 and can be set to, for example, identification information specific to the key unit 100 of the onboard unit 10A thereof.

The authentication information database D22 may store information on a validity period of authentication information, whether the authentication information has been invalidated, and the like in addition to the authentication information of the vehicle 10. The validity period of authentication information may be transmitted to the delivery management server 410 or the receiver terminal 200 along with the authentication information. When the validity period of the authentication information is received, the delivery management server 410 or the receiver terminal 200 can invalidate the authentication information of which the validity period has expired by deletion. Information about whether the authentication information is invalidated indicates whether the authentication information has been transmitted to the receiver terminal 200 and is valid or whether the validity period has expired and the authentication information is invalid. When the authentication information has been transmitted to the receiver terminal 200 and is valid, the authentication information managing unit F21 can prohibit the authentication information from being issued and avoid duplicated issuance of the authentication information.

FIG. 8 is a diagram illustrating a functional configuration of a deliverer terminal. A deliverer terminal 210 includes a delivery object information registering unit F31 and a delivery status managing unit F32 as functional units. The processor 211 of the deliverer terminal 210 performs processes of the delivery object information registering unit F31 and the delivery status managing unit F32 by executing a computer program in the main storage unit 212. One of the functional units or some of the processes thereof may be implemented by a hardware circuit.

The delivery object information registering unit F31 receives an input of information on an object to be rented or transferred by a deliverer and transmits the input information to the delivery management server 410. The deliverer can register an object via a screen illustrated in FIG. 9.

FIG. 9 is a diagram illustrating a delivery object information registration screen. A delivery object information registration screen SC1 is a screen that is used for a deliverer to register an object to be rented or transferred and is provided by a predetermined application for using a service provided by the trunk sharing system 1. On the delivery object information registration screen SC1, fields of deliverer information SC11 (an ID and a name), vehicle number SC12, vehicle model SC13, color SC14, position information SC15, object SC16, usage type SC17, amount of money SC18, and usage deadline SC19 and a registration button SC20 labeled with "registration" are displayed.

The deliverer information SC11 (an ID and a name) is a field for displaying information of a deliverer. The information of a deliverer is registered in advance by a predetermined application. The vehicle number SC12 is a field for inputting a vehicle number of a vehicle 10. The vehicle model SC13 and the color SC14 are fields for selecting a vehicle model and a color of a vehicle 10. The vehicle number, the vehicle model, and the color of a vehicle 10 are information for specifying the vehicle 10 in which a receiver receives an object and is provided to the receiver by being transmitted to a receiver terminal 200. The position information SC15 is a field for inputting position information of a vehicle 10. A deliverer can input information such as an address at which the vehicle 10 stops as position information. The information for specifying a vehicle 10 such as the vehicle number SC12, the vehicle model SC13, the color SC14, and the position information SC15 may be registered in advance along with the information of a deliverer. The information for specifying a vehicle 10 may be registered in advance in the user information database D21 in correlation with identification information of a deliverer (a deliverer ID) in the central server 400. In this case, the deliverer can notify the receiver of the information for specifying a vehicle 10 from the central server 400 by inputting a deliverer ID on the delivery object information registration screen SC1.

The object SC16 is a field for inputting a name of an object to be rented or transferred. The usage type SC17 is a field of selecting a usage type of an object about whether it is rented or transferred. The amount of money SC18 is a field for inputting an amount of money of a price for rental or transfer of an object. The usage deadline SC19 is a field for inputting a deadline up to which an object can be rented from a deliverer to a receiver. When transfer is selected in the usage type SC17, the usage deadline SC19 may not be displayed on the delivery object information registration screen SC1 or may be a field for inputting a usage deadline of an object, a validity deadline in case of foods. The registration button SC20 is an operation button for transmitting information selected or input on the delivery object information registration screen SC1 as delivery object information to the delivery management server 410. The delivery management server 410 stores the received delivery object information in the delivery object information database D11.

The delivery status managing unit F32 illustrated in FIG. 8 acquires information of delivery statuses such as a request status for use, an actual usage status, and a payment status for charging in association with an object registered on the delivery object information registration screen SC1 from the delivery management server 410 and presents the acquired information to a deliverer. The delivery status managing unit F32 may receive the information of delivery statuses by an e-mail to a deliverer or the like.

Figure 10:
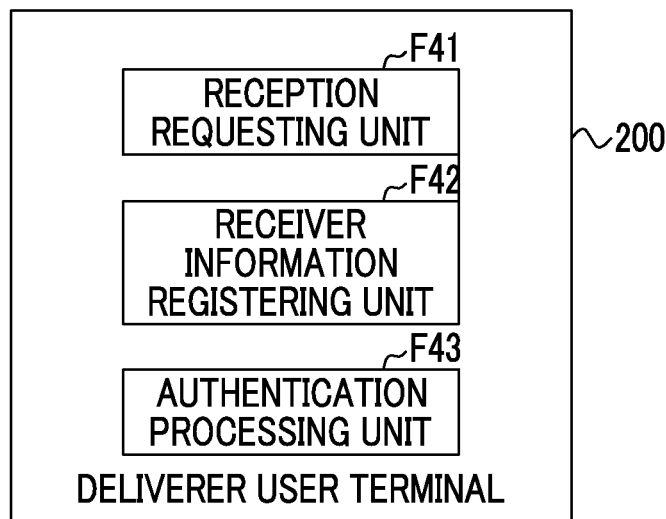
FIG. 10 is a diagram illustrating a functional configuration of a receiver terminal.

FIG. 10 is a diagram illustrating a functional configuration of a receiver terminal. A receiver terminal 200 includes a reception requesting unit F41, a receiver information registering unit F42, and an authentication processing unit F43 as functional units. The processor 201 of the receiver terminal 200 performs processes of the reception requesting unit F41, the receiver information registering unit F42, and the authentication processing unit F43 by executing a computer program in the main storage unit 202. One of the functional units or some of the processes thereof may be implemented by a hardware circuit.

Figure 11:
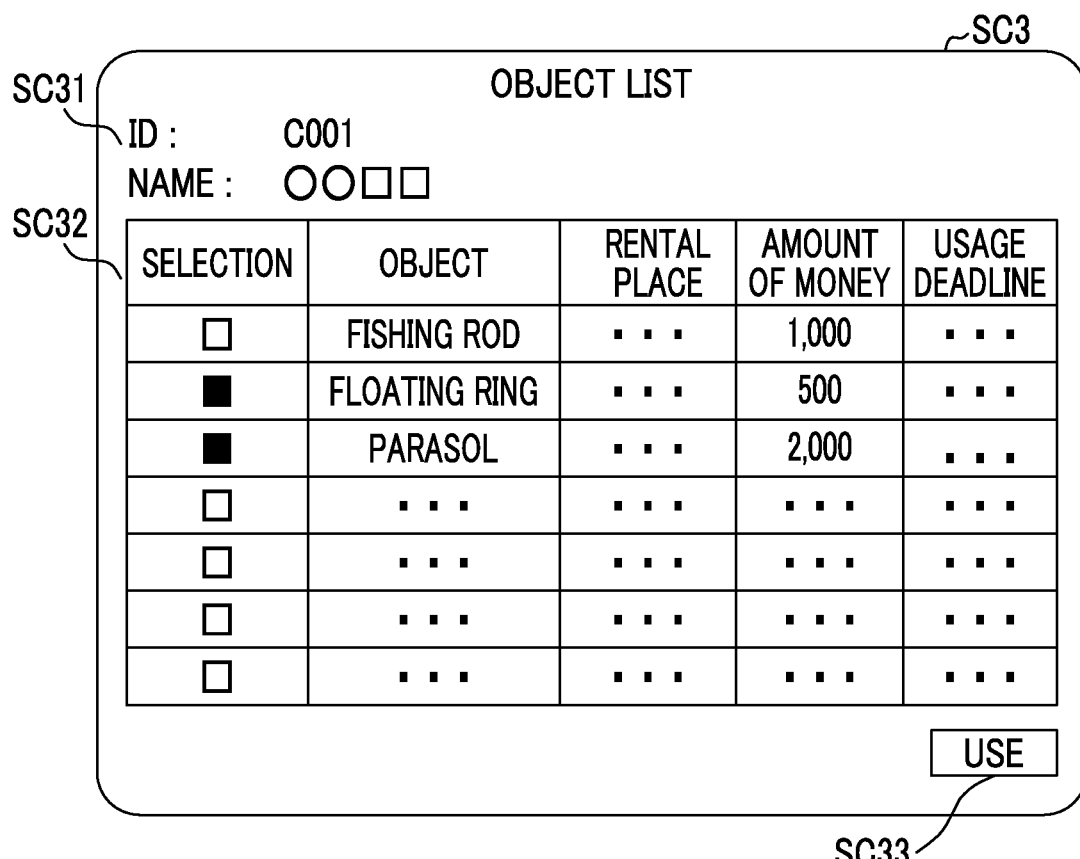
FIG. 11 is a diagram illustrating an object list screen in which objects to be rented or transferred are displayed in a list.

The reception requesting unit F41 acquires information of objects to be rented or transferred which has been registered from a deliverer terminal 210 from the delivery management server 410 and displays the acquired information as an object list illustrated in FIG. 11 on the receiver terminal 200. A receiver selects an object which the receiver wants to use from the object list and requests use thereof from a use registration screen illustrated in FIG. 12. The reception requesting unit F41 transmits a request for reception of an object to the delivery management server 410 based on information which is input to the use registration screen by the receiver.

FIG. 11 is a diagram illustrating an object list screen which is displayed as a list of objects to be rented or transferred. The object list screen SC3 is a screen which is used for a receiver to select an object of which use is desired and is provided by a predetermined application. On the object list screen SC3, fields of receiver information SC31 (an ID and a name) and object list SC32 and a use registration button SC33 labeled with "use" are displayed.

The receiver information SC31 (an ID and a name) is a field for displaying information of a receiver. The information of a receiver is registered in advance by a predetermined application. The object list SC32 is a field for displaying a list of objects to be rented or transferred. The object list SC32 includes fields of selection, object, rental place, amount of money, and usage deadline. The field of selection is a check box which is used for a receiver to select a desired object. Registration of the checked object is performed on the use registration screen illustrated in FIG. 12. The field of object is a name of an object of which use is desired by a receiver. The field of rental place is position information of a vehicle 10 in which an object of which use is desired by a receiver is stored. The field of amount of money is an amount of money of a price for the object. The usage deadline is a deadline up to which an object can be rented. When an object is to be transferred, the usage deadline may be set to a usage deadline of the object or may be blank. The use registration button SC33 is an operation button for transitioning to a use registration screen in which registration of reception of the object selected in the object list SC32 is performed. When the use registration button SC33 is pressed, the screen of the receiver terminal 200 transitions to the user registration screen.

FIG. 12 is a diagram illustrating a user registration screen. The use registration screen SC5 is a screen for performing registration of reception of an object of which use is desired by a receiver and is provided by a predetermined application. On the use registration screen SC5, fields of receiver information SC51 (an ID and a name), reception object information SC52 (a reception object and a price), contact information SC53, usage period SC54, and payment method SC55, and a reception registration button SC56 labeled with "registration" are displayed.

The receiver information SC51 (an ID and a name) is the same as the receiver information SC31 in FIG. 11 and thus description thereof will not be repeated. The reception object information SC52 (a reception object and a price) is a field for displaying object information such as a name of an object selected from the object list SC32 illustrated in FIG. 11 by a receiver and a price for the selected object. In the example illustrated in FIG. 11, the reception object information SC52 displays names of a plurality of objects of which use is desired (a "floating ring" and a "parasol") and a total amount of money of prices for a plurality of objects, but may display a price for each object or may display other object information such as a usage deadline.

The contact information SC53 is a field for inputting contact information of a receiver. The contact information SC53 is, for example, a mobile phone number or an e-mail address of a receiver. The usage period SC54 is a period in which a receiver wants to use the object selected from the object list SC32. When the object is an object to be transferred, the receiver may not input information to the field of usage period SC54. The field of usage period SC54 may receive an input of a date within the usage deadline displayed in the object list SC32. The payment method SC55 is a field for selecting a payment method when a receiver pays the price. The reception registration button SC56 is an operation button which is used for a receiver to perform registration of reception. When the reception registration button SC56 is pressed, the reception requesting unit F41 transmits information of a request for reception input to the use registration screen SC5 to the delivery management server 410. The delivery management server 410 stores the received information of the request for reception in the reception request database D12.

The receiver information registering unit F42 illustrated in FIG. 10 receives registration of information of a receiver in advance before the receiver requests use of an object. The information of a receiver may include information such as contact information or a payment method in addition to a name of the receiver. The receiver can skip inputting of information of the receiver when requesting use of an object by registering a variety of information in advance, and thus it is possible to improve convenience in a procedure of registration of reception of an object.

When a receiver receives an object of which reception has been registered, the authentication processing unit F43 receives authentication information for authentication by the key unit 100 of a vehicle 10 which has been designated as a delivery place. The authentication processing unit F43 provides an interface for unlocking or locking the vehicle 10 which has been designated as a delivery place of an object using the authentication information received by the receiver. The receiver can perform unlock the vehicle 10 which is a delivery place of an object, for example, by performing an operation on an authentication processing screen SC7 illustrated in FIG. 13. The authentication processing unit F43 may provide a screen for performing locking of the vehicle 10 or requesting retransmission of invalidated authentication information in addition to the screen for unlocking the vehicle 10.

FIG. 13 is a diagram illustrating an authentication processing screen. The authentication processing screen SC7 illustrated in FIG. 13 is a screen for performing unlocking of a vehicle 10 which is a delivery place of an object. On the authentication processing screen SC7, fields of receiver information SC71 (an ID and a name) and reception object information SC72 (a reception object, a price, and a usage period), an unlocking button SC73 labeled with "YES," and a cancel button SC74 labeled with "NO" are displayed.

The receiver information SC71 (an ID and a name) is the same as the receiver information SC31 illustrated in FIG. 11 and thus description thereof will not be repeated. The reception object information SC72 (a reception object, a price, and a usage period) is a field for displaying object information such as a name of an object selected from the object list SC32 illustrated in FIG. 11 by a receiver, a price for the selected object, and a usage period. The unlocking button SC73 is an operation button for unlocking a vehicle 10 which is a delivery place of an object. When the unlocking button SC73 is pressed, the short-range communication unit 103 of the key unit 100 receives authentication information from the receiver terminal 200. The authentication unit 1042 of the key unit 100 performs an authentication process by comparing the received authentication information with authentication information stored in the storage unit 1041. When authentication has succeeded, the authentication unit 1042 of the key unit 100 transmits an unlocking signal to the locking/unlocking device 300 along with identification information (a key ID) of the vehicle correlated with the authentication information, and the vehicle 10 is unlocked when authentication of the key ID has succeeded.

FIG. 14 is a diagram illustrating a flow of operations in the trunk sharing system according to this embodiment. FIG. 14 illustrates a flow of operations between the elements in the trunk sharing system 1 when the deliverer delivers the object to the receiver and processes which are performed by the elements. In FIG. 14, it is assumed that authentication information is invalidated after a receiver has received an object and the receiver receives authentication information again at the time of return of the object.

A deliverer first inputs information such as a name and contact information of the deliverer to the deliverer terminal 210 and registers use of the trunk sharing system 1. The information of the deliverer input to the deliverer terminal 210 is transmitted to the delivery management server 410 (S10). The delivery management server 410 registers the received information of the deliverer in the delivery object information database D11 (S11).

Then, the deliverer inputs information of an object to be rented or transferred and information of a vehicle 10 which is used for delivery to the deliverer terminal 210 and registers the information. The information of an object and the information of a vehicle 10 input to the deliverer terminal 210 is transmitted to the delivery management server 410 (S12). The delivery management server 410 registers the received information of an object and the received information of a vehicle 10 in the delivery object information database D11 (S13). The delivery management server 410 discloses an object list on a web site which is accessed from a predetermined application based on the registered information of an object (S14).

Similarly to the deliverer, a receiver inputs information such as a name and contact information of the receiver to a receiver terminal 200 and registers use of the trunk sharing system 1 from a predetermined application. The information of the receiver input to the receiver terminal 200 is transmitted to the delivery management server 410 (S15). The delivery management server 410 registers the received information of a receiver in the reception request database D12 (S16).

When registration of use of the trunk sharing system 1 has been completed, the receiver requests reception (requests use) of an object of which use is desired with reference to the object list disclosed on the web site in S14 (S17). The receiver can transmit the request for reception, for example, on the use registration screen SC5 illustrated in FIG. 12.

When the request for reception of an object is received from the receiver terminal 200, the delivery management server 410 transmits information such as identification information of a deliverer (a deliverer ID) and contact information of the receiver terminal 200 which is a transmission destination of authentication information to the central server 400 and requests the central server 400 to transmit authentication information to the receiver terminal 200 (S18). When the request for transmission of authentication information is received, the central server 400 issues authentication information based on the received identification information of the deliverer (S19) The central server 400 transmits the issued authentication information to the receiver terminal 200 (S20).

The receiver terminal 200 transmits the authentication information transmitted to the receiver terminal 200 to the onboard unit 10A (the key unit 100) of the vehicle 10 in which an object to be received is stored and request unlocking. When authentication of the receiver terminal 200 using the authentication information has succeeded, the vehicle 10 is unlocked (S21).

When the receiver performs an unlocking operation, the delivery management server 410 receives an unlocking notification from the receiver terminal 200 (S22). After the unlocking notification has been received or when a validity period of the authentication information has expired, the delivery management server 410 requests the central server 400 to invalidate the authentication information transmitted in S20 (S23). The central server 400 invalidates the authentication information S(24). The delivery management server 410 or the receiver terminal 200 can invalidate the authentication information by deleting the authentication information received from the central server 400 in response to an instruction from the central server 400. The central server 400 can perform exclusive control for preventing authentication information from being issued double or can update authentication information and notify the updated authentication information to the key unit 100, by managing whether authentication information is to be invalidated. The process of S24 may be skipped, or the delivery management server 410 or the receiver terminal 200 may invalidate the authentication information by deletion after the receiver has performed an unlocking operation. When the receiver has not locked the vehicle 10 after taking out an object, the onboard unit 10A may lock the vehicle 10 after a predetermined has elapsed after the vehicle has been unlocked.

The delivery management server 410 charges a price for the object received by the receiver in accordance with the payment method registered by the receiver (S25). The charging process may be performed at any time after the vehicle 10 has been unlocked in S21.

When the received object is returned, the receiver transmits a request for return from the receiver terminal 200 to the delivery management server 410 in order to acquire authentication information for unlocking the vehicle 10 (S26). When the request for return is received from the receiver terminal 200, the delivery management server 410 transmits information such as identification information of the deliverer (the deliverer ID) and contact information of the receiver terminal 200 which is a transmission destination of authentication information to the central server 400 and requests the central server 400 to transmit authentication information to the receiver terminal 200 (S27). The vehicle 10 as a return place of an object may be another vehicle 10 which is designated by the deliverer and correlated with another deliverer ID. In this case, the receiver can specify the vehicle 10 as a return place by receiving information such as a vehicle number, a vehicle model, and a color of the vehicle 10 as a return place along with the authentication information using the receiver terminal 200. When the request for transmission of authentication information is received, the central server 400 issues authentication information based on the identification information of the deliverer received from the delivery management server 410 (S28). The central server 400 transmits the issued authentication information to the receiver terminal 200 (S29).

The receiver terminal 200 transmits the authentication information transmitted to the receiver terminal 200 to the onboard unit 10A of the vehicle 10 as a return place of an object and requests the onboard unit 10A to unlock the vehicle. When authentication of the receiver terminal 200 using the authentication information has succeeded, the vehicle 10 is unlocked. The receiver terminal 200 transmits authentication information to the onboard unit 10A and requests the onboard unit 10A to lock the vehicle after the object has been returned. When authentication of the receiver terminal 200 using the authentication information has succeeded, the vehicle 10 is locked (S30).

When the receiver performs a locking operation, the delivery management server 410 receives a locking notification from the receiver terminal 200 (S31). After the locking notification has been received or after a validity period of the authentication information has expired, the delivery management server 410 requests the central server 400 to invalidate the authentication information transmitted in S29 (S32). Then, the central server 400 invalidates the authentication information (S33). The process of invalidating the authentication information is the same as the process of S24. When the receiver has not locked the vehicle 10 after returning the object, the onboard unit 10A may lock the vehicle 10 after a predetermined time has elapsed after the vehicle has been unlocked and notify the delivery management server 410 of locking.

Figure 15:
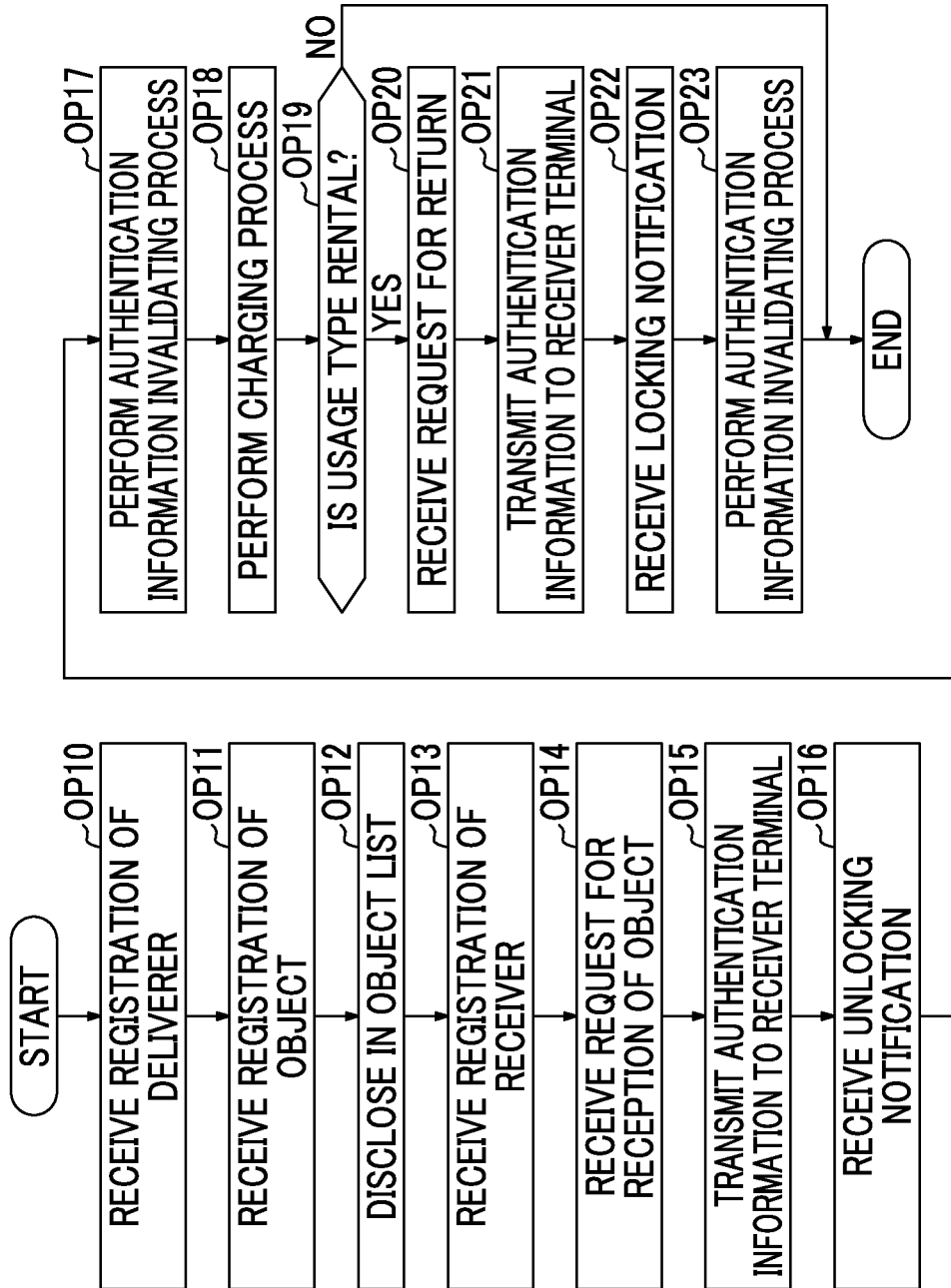
FIG. 15 is a flowchart illustrating a flow of an object delivering process which is performed by the delivery management server.

FIG. 15 is a flowchart illustrating a flow of an object delivering process which is performed by the delivery management server. This process flow is started, for example, when a deliverer registers use of the trunk sharing system 1 from a deliverer terminal 210.

First, in OP10, the delivery object information acquiring unit F11 receives registration of information on a deliverer. The delivery object information acquiring unit F11 receives the information on a deliverer from the deliverer terminal 210 and registers the received information in the delivery object information table of the delivery object information database D11 in correlation with information for identifying the deliverer (the deliverer ID).

In OP11, the delivery object information acquiring unit F11 receives registration of an object to be rented or transferred. The delivery object information acquiring unit F11 receives information of the object and information of a vehicle 10 in which the object is stored from the deliverer terminal 210 and stores the received information in the delivery object information table of the delivery object information database D11 in correlation with the information for identifying the object (the object ID) and the deliverer ID.

In OP12, the delivery object information providing unit F12 discloses the information of the object of which registration has been received in OP11 in the object list. When a request for additional registration, update, and deletion of an object has been received from the deliverer terminal 210, the delivery object information providing unit F12 updates the object list in response to the request.

In OP13, the receiver information acquiring unit F14 receives registration of information on a receiver. The delivery object information acquiring unit F11 receives the information on a receiver from the receiver terminal 200 and stores the received information in the reception request table of the reception request database D12 in correlation with the information for identifying the receiver (the receiver ID).

In OP14, the reception request receiving unit F13 receives a request for reception (a request for use) from the receiver terminal 200. The reception request receiving unit F13 receives information on an object of which use or purchase is desired by the receiver from the receiver terminal 200 and stores the received information in the reception request table of the reception request database D12 in correlation with the receiver ID.

In OP15, the authentication information issuing unit F15 requests the central server 400 to transmit authentication information to the receiver terminal 200. The reception request receiving unit F13 transmits identification information of a deliverer (a deliverer ID) correlated with the authentication information of the vehicle 10 in which the object of which the request for reception has been transmitted is stored to the central server 400 along with the request for transmission of authentication information. When the deliverer ID is received, the central server 400 can issue authentication information correlated with the deliverer ID and transmit the issued authentication information to the receiver terminal 200 or the delivery management server 410. The authentication information issuing unit F15 may receive authentication information from the central server 400 and transmit the received authentication information to the receiver terminal 200.

In OP16, when the vehicle 10 in which the object to be received is stored is unlocked, the authentication information issuing unit F15 receives a notification indicating that the vehicle 10 has been unlocked from the onboard unit 10A or the receiver terminal 200.

In OP17, the authentication information issuing unit F15 requests the central server 400 to invalidate the authentication information after a validity period of the authentication information has expired. When the notification indicating that the vehicle 10 has been unlocked is received from the onboard unit 10A or the receiver terminal 200, the authentication information issuing unit F15 may request the central server to invalidate the authentication information. The invalidation of the authentication information is the same as the process of S24 in FIG. 14. When a locking signal is not received from the receiver terminal 200, the onboard unit 10A may lock the vehicle after a predetermined time has elapsed after the vehicle has been unlocked.

In OP18, the charging managing unit F16 charges the receiver for a price for the object received by the receiver. The charging managing unit F16 can perform a charging process based on the payment method included in the receiver information registered in OP13.

In OP19, the reception request receiving unit F13 determines whether the usage type of the object received by the receiver is rental or transfer. When the usage type of the object is rental (YES in OP19), the process flow transitions to OP20. When the usage type of the object is transfer (NO in OP19), the object delivering process illustrated in FIG. 15 ends.

In OP20, the reception request receiving unit F13 receives an object ID to be returned from the receiver terminal 200 and receives a request for return of an object. When the usage period included in the information of an object received in OP14 has elapsed, the reception request receiving unit F13 may determine that a request for return of an object has been received and continuously perform the process flow.

The process of OP21 is the same as the process of OP15 and thus description thereof will not be repeated. In OP22, when the receiver unlocks the vehicle 10, returns the object, and locks the vehicle 10, the authentication information issuing unit F15 receives a notification indicating that the vehicle 10 has been locked from the onboard unit 10A or the receiver terminal 200.

In OP23, the authentication information issuing unit F15 requests the central server 400 to invalidate the authentication information after the validity period of the authentication information has expired. When the notification indicating that the vehicle 10 has been locked has been received from the onboard unit 10A or the receiver terminal 200, the authentication information issuing unit F15 may request the central server 400 to invalidate the authentication information. The invalidation of the authentication information is the same as the process of S33 in FIG. 14. When a locking signal has not been received from the receiver terminal 200, the onboard unit 10A may lock the vehicle after a predetermined time has elapsed from the vehicle has been unlocked. When the authentication information transmitted in OP21 is invalidated, the object delivering process illustrated in FIG. 15 ends.

In the embodiment, an example in which the vehicle 10 is unlocked by the locking/unlocking device 300 when an authentication process in the key unit 100 has succeeded is described above, but the process in the key unit 100 may be performed in the locking/unlocking device 300 in Modified Example 1 of the embodiment. That is, the locking/unlocking device 300 may include a control unit (ECU) for authenticating authentication information received from a receiver terminal 200, and the control unit may transmit an unlocking command or a locking command to the body ECU 304 via an onboard network such as a CAN when authentication of the receiver terminal 200 has succeeded.

With the trunk sharing system 1 according to Modified Example 1, it is possible to deliver an object to a receiver who is a third party with a simple configuration without installing the key unit 100.

In the above-mentioned embodiment, a receiver terminal 200 receives authentication information from the central server 400, a locking/unlocking signal is transmitted from the key unit 100 to the locking/unlocking device 300 when the receiver terminal 200 has been authenticated based on the received authentication information, and the vehicle 10 is locked or unlocked. In Modified Example 2 of the embodiment, authentication information includes information of a key ID for locking and unlocking a vehicle 10, not information for authenticating a receiver terminal 200.

In this case, the receiver terminal 200 receives authentication information including a key ID for locking and unlocking a vehicle 10 from the central server 400, and transmits the received key ID along with a locking/unlocking signal to the locking/unlocking device 300. The locking/unlocking device 300 compares the received key ID with a key ID stored in advance in the locking/unlocking device 300 and locks and unlocks the vehicle 10 when the two key IDS coincide with each other. The key ID is transmitted and received in an encrypted state between the receiver terminal 200 and the central server 400 or the locking/unlocking device 300. The authentication information managing unit F21 of the central server 400 may generate a one-time key, for example, by encrypting the key ID using a predetermined algorithm along with time information. The locking/unlocking device 300 decrypts the received one-time key using the same algorithm as in the central server 400 and compares the decrypted one-time key with the key ID stored in advance in the locking/unlocking device 300. The one-time key may be transmitted from the central server 400 to the delivery management server 410 and may be transmitted from the delivery management server 410 to the receiver terminal 200.

By including a one-time key generated from a key ID and time information in authentication information, the central server 400 can generate authentication information which is temporarily valid for each request for reception and transmit the generated authentication information to the receiver terminal 200.

In the above-mentioned embodiment and Modified Example 2, the central server 400 transmits authentication information for a receiver terminal 200 corresponding to fixed authentication information specific to the key unit 100 or a key ID stored in advance in the locking/unlocking device 300 of the vehicle 10 to the receiver terminal 200. However, authentication information transmitted between the receiver terminal 200 and the key unit 100 is not limited thereto. In Modified Example 3, for example, the central server 400 may generate new authentication information and issue the new authentication information to the receiver terminal 200 when a request for reception of an object is received from the receiver terminal 200. In this case, the central server 400 can transmit authentication information for the key unit 100 corresponding to the new authentication information for the receiver terminal 200 to the key unit 100 via an onboard communication device (not illustrated) which can communicate with the network N1 connected to the central server 400 and store the authentication information therein. In this case, the key unit 100 can be connected to the onboard communication device via the CAN or the like. Here, the central server 400 may generate new authentication information based on identification information for identifying the vehicle 10 and time information and transmit the new authentication information and the time information to the receiver terminal 200. In this case, the key unit 100 can also generate new authentication information using the same algorithm as in the central server 400. The receiver terminal 200 can transmit the new authentication information and the time information to the key unit 100 and be subjected to authentication.

In the trunk sharing system 1 according to the embodiment and the modified examples, only a cargo compartment door of a vehicle 10 is unlocked/locked in consideration of a security in locking and unlocking the vehicle 10, and a passenger compartment door is not unlocked/locked but is kept in a locked state. In a vehicle 10 having a body structure in which the cargo compartment and the passenger compartment are not partitioned from each other, for example, a vehicle 10 which is called one box type, since a person can access the passenger compartment by unlocking the cargo compartment door, there is a likelihood that a user such as a deliverer will have concern about security.

Therefore, in a vehicle 10 in which the cargo compartment and the passenger compartment are not partitioned from each other, when the cargo compartment door has been opened, the trunk sharing system 1 may capture a moving image of the interior space using a drive recorder which can also image the interior space and determine whether a person has invaded into the passenger compartment from the cargo compartment based on the captured moving image. When it is determined that a person has invaded into the passenger compartment from the cargo compartment, the trunk sharing system 1 performs storage of the captured moving image, operation of an onboard alarm, notification to a service provider, notification to a user, and the like. On the other hand, when it is determined that a person has not invaded into the passenger compartment, the trunk sharing system 1 may delete the captured moving image at a time point at which an operation of closing and locking the cargo compartment door has been performed. Alternatively, the trunk sharing system 1 may transmit the captured moving image to the deliverer terminal 210 regardless of whether a person has invaded into the passenger compartment as a part of a user service.

In the above-mentioned embodiment and the modified examples, a vehicle 10 is used as an object delivery place, but the trunk sharing system 1 may be applied to an example in which authentication information is transmitted and invalidated using a facility or a building other than a vehicle as an object delivery place.

The trunk sharing system 1 according to the embodiment can realize a service of providing and using various objects in parking lots close to tourist resorts, various facilities, or the like. The trunk sharing system 1 transmits authentication information of a vehicle 10 in which an object to be used is stored to a receiver terminal 200 by acquiring delivery object information of an object of which delivery from a deliverer is desired and acquiring receiver information from a receiver who wants to use the object. Since the receiver can unlock the vehicle 10 in which the object to be used is stored using the authentication information received by the receiver terminal 200 and receive the object to be used, it is possible to improve convenience for a receiver.

Since the trunk sharing system 1 discloses delivery object information of objects acquired from deliverers as an object list on a web site, a receiver can select and use a desired object with reference to conditions such as a reception place and a usage deadline in the object list.

In trunk sharing system 1, by acquiring information of a receiver who receives an object and receiving a request for reception of an object, authentication information of a vehicle which is a delivery place can be transmitted to a receiver terminal 200 based on the receiver information.

In the trunk sharing system 1, authentication information in which a validity period is set can be issued depending on a usage type of an object by including information of a validity period in the authentication information and thus it is possible to achieve an improvement in security.

In the trunk sharing system 1, by invalidating authentication information when a notification indicating that a vehicle 10 has unlocked or locked has been received, the authentication information can be invalidated at an appropriate time after a receiver has taken out or returned an object and thus it is possible to achieve an improvement in security.

In the trunk sharing system 1, when a receiver unlocks a vehicle 10 in which an object to be rented or transferred is stored, it is possible to simplify a charging process by performing a charging process on the receiver.

A program causing a computer or other machine or device (hereinafter referred to as a computer or the like) to execute any one of the above-mentioned functions can be recorded on a recording medium which can be read by a computer or the like. By causing the computer or the like to read and execute the program of the recording medium, the functions can be provided.

Here, a recording medium which can be read by a computer or the like refers to a non-transitory recording medium which can store information such as data or programs in an electrical, magnetic, optical, mechanical, or chemical action and be read by the computer or the like. Examples of the recording medium which can be detached from the computer or the like include a flexible disc, a magneto-optical disc, a CD-ROM, a CD-R/W, a DVD, a Blu-ray disc, a DAT, a 8 mm tape, and a memory card such as a flash memory. Examples of the recording medium which is fixed to the computer or the like include a hard disk and a ROM. A solid state drive (SSD) can be used as a recording medium which can be detached from the computer or the like and can also be used as a recording medium which is fixed to the computer or the like.

What is claimed is:

1. An information processing system comprising:
a processor programmed to:
acquire delivery object information of an object from a deliverer of the object, the object being stored in an interior space of a vehicle, and the object of which delivery is desired;
acquire receiver information on a receiver of the object, the receiver information being acquired from a terminal of the receiver;
issue authentication information for locking and unlocking a door of the vehicle based on the delivery object information and the receiver information;
transmit the authentication information to the terminal of the receiver;
receive a notification from the terminal of the receiver indicating that the terminal of the receiver transmitted the authentication information for locking and unlocking the door of the vehicle; and
invalidate the authentication information upon reception of the notification indicating that the terminal of the receiver transmitted to the vehicle the authentication information for locking and unlocking the door of the vehicle.

2. The information processing system according to claim 1, wherein the processor is programmed to disclose a plurality of pieces of delivery object information as an object list on a web site.

3. The information processing system according to claim 2, wherein the processor is programmed to:
receive a request for reception of a predetermined object selected from the object list, and
acquire the receiver information on the receiver of the predetermined object.

4. The information processing system according to claim 1, wherein the authentication information includes information of a validity period of the authentication information based on a usage type of the object.

5. The information processing system according to claim 1, wherein the processor is programmed to charge the receiver for a cost generated in association with usage of the object when the notification indicating that the door of the vehicle has been unlocked is received from the terminal of the receiver.

6. An information processing device comprising:
a processor programmed to:
acquire delivery object information of an object from a deliverer of the object, the object being stored in an interior space of a vehicle, and the object of which delivery is desired;
acquire receiver information on a receiver of the object, the receiver information being acquired from a terminal of the receiver;
issue authentication information for locking and unlocking a door of the vehicle based on the delivery object information and the receiver information;
transmit the authentication information to the terminal of the receiver;
receive a notification from the terminal of the receiver indicating that the terminal of the receiver transmitted the authentication information for locking and unlocking the door of the vehicle; and
invalidate the authentication information upon reception of the notification indicating that the terminal of the receiver transmitted to the vehicle the authentication information for locking and unlocking the door of the vehicle.

7. An information processing method for an information processing system, the information processing system including a computer, the information processing method comprising:
causing the computer to acquire delivery object information of an object from a deliverer of the object, the object being stored in an interior space of a vehicle, and the object of which delivery is desired;
causing the computer to acquire receiver information on a receiver of the object, the receiver information being acquired from a terminal of the receiver;
causing the computer to issue authentication information for locking and unlocking a door of the vehicle based on the delivery object information and the receiver information;
causing the computer to transmit the authentication information to the terminal of the receiver;
causing the computer to receive a notification from the terminal of the receiver indicating that the terminal of the receiver transmitted the authentication information for locking and unlocking the door of the vehicle; and
causing the computer to invalidate the authentication information upon reception of the notification indicating that the terminal of the receiver transmitted to the vehicle the authentication information for locking and unlocking the door of the vehicle.

8. A non-transitory recording medium storing a program, the program causing a computer to perform a method comprising:
acquiring delivery object information of an object from a deliverer of the object, the object being stored in an interior space of a vehicle, and the object of which delivery is desired;
acquiring receiver information on a receiver of the object, the receiver information being acquired from a terminal of the receiver;
issuing authentication information for locking and unlocking a door of the vehicle based on the delivery object information and the receiver information;
transmitting the authentication information to the terminal of the receiver;
receiving a notification from the terminal of the receiver indicating that the terminal of the receiver transmitted the authentication information for locking and unlocking the door of the vehicle; and
invalidating the authentication information upon reception of the notification indicating that the terminal of the receiver transmitted to the vehicle the authentication information for locking and unlocking the door of the vehicle.

9. A vehicle interior sharing system comprising:
a processor programmed to:
receive, from a terminal of a receiver, a request for delivery of an object,
transmit, in response to the request, electronic authentication information to the terminal of the receiver to deliver the object stored in an interior space of a vehicle, the electronic authentication information being information that permits opening and closing of a door of the vehicle in which a deliverer stores the object;

receive a notification from the terminal of the receiver indicating that the terminal of the receiver transmitted the electronic authentication information for locking and unlocking the door of the vehicle; and invalidate the electronic authentication information when a upon reception of the notification indicating that the terminal of the receiver transmitted to the vehicle the electronic authentication information for locking and unlocking the door of the vehicle, wherein the receiver receives delivery of the object stored in the interior space of the vehicle.

10. The vehicle interior sharing system according to claim 9, wherein the electronic authentication information includes a limiting date and time or a limiting period.

11. The information processing system according to claim 1, wherein the receiver receives delivery of the object stored in the interior space of the vehicle.

12. The information processing device according to claim 6, wherein the receiver receives delivery of the object stored in the interior space of the vehicle.

13. The information processing method according to claim 7, wherein the receiver receives delivery of the object stored in the interior space of the vehicle.

14. The non-transitory recording medium according to claim 8, wherein the receiver receives delivery of the object stored in the interior space of the vehicle.

15. The information processing system according to claim 1, wherein the vehicle is owned by the deliverer.

16. The information processing device according to claim 6, wherein the vehicle is owned by the deliverer.

17. The information processing method according to claim 7, wherein the vehicle is owned by the deliverer.

18. The non-transitory recording medium according to claim 8, wherein the vehicle is owned by the deliverer.

19. The vehicle interior sharing system according to claim 9, wherein the vehicle is owned by the deliverer.

* * * * *